UNITED STATES PATENT OFFICE.

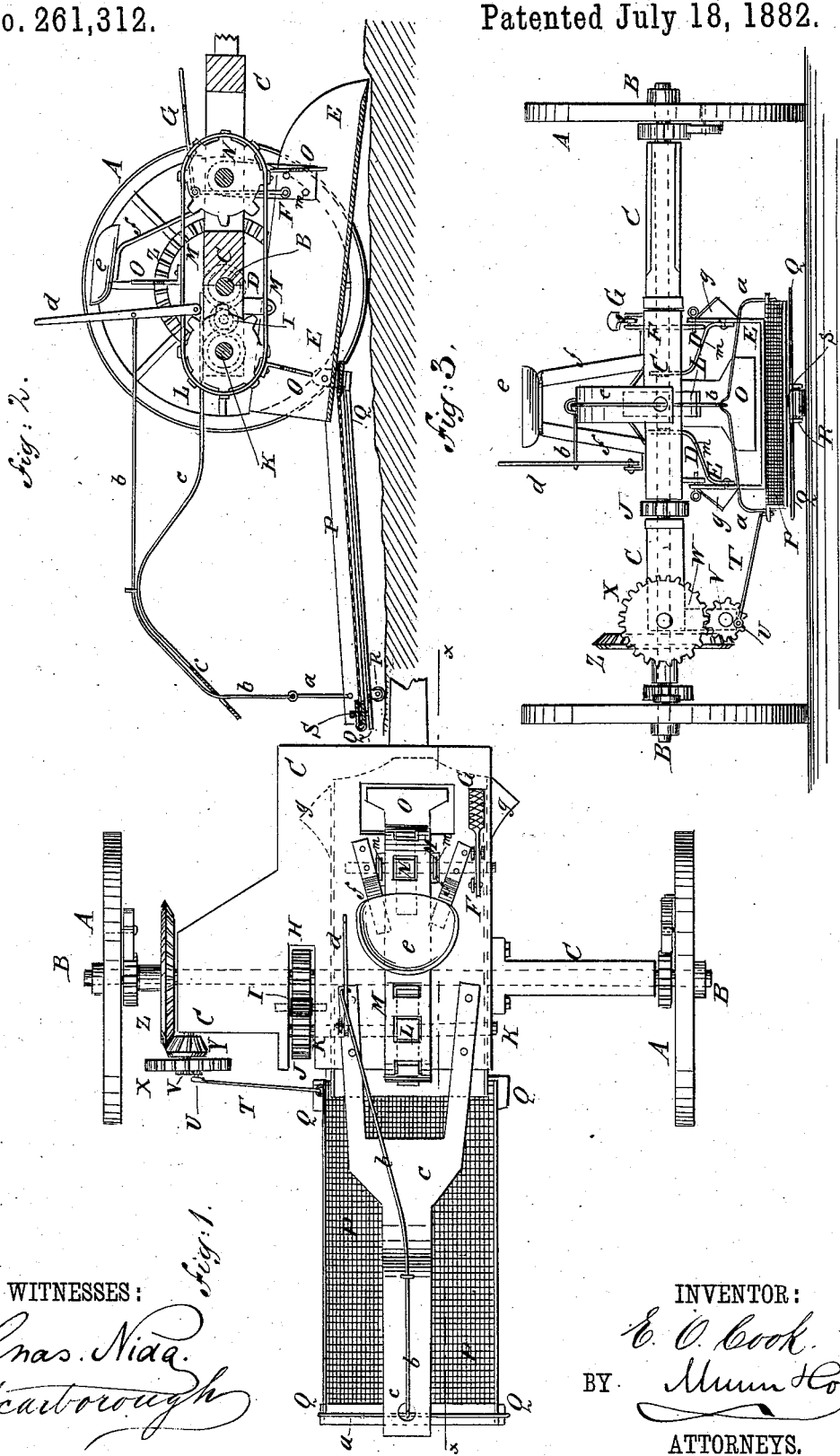

EDWARD O. COOK, OF WORCESTER, MASSACHUSETTS.

POTATO-DIGGER.

SPECIFICATION forming part of Letters Patent No. 261,312, dated July 18, 1882.

Application filed September 9, 1881. (No model.)

*To all whom it may concern:*

Be it known that I, EDWARD O. COOK, of Worcester, in the county of Worcester and State of Massachusetts, have invented a certain new and useful Improvement in Potato-Diggers, of which the following is a full, clear, and exact description, reference being had to the accompanying drawings, forming part of this specification, in which similar letters of reference indicate corresponding parts in all the figures.

Figure 1 is a plan view of my improvement. Fig. 2 is a sectional side elevation of the same, taken through the line $x\ x$, Fig. 1. Fig. 3 is a rear elevation of the same.

My invention is an improvement in that class of potato-diggers which are provided with a scoop for removing potatoes from their bed, a shaking screen for separating the potatoes from the soil, and a traveling conveyer for transferring them from such scoop to the screen.

My improvement pertains, first, to the means for supporting the screen and attaching it to the scoop, and, second, to the combination and arrangement, with the axle and frame, of the gearing and other parts of the conveyer, as hereinafter described.

A are the wheels, the axle B of which revolves in bearings in the frame C.

To hangers D, or other supports attached to the frame C, are hinged the upper parts of the side flanges of the scoop E. The scoop E is set in an inclined position, so that its forward end will enter the ground and pass beneath and raise the potatoes and the soil in which they are embedded.

Upon the forward ends of the sides of the scoop E are formed, or to them are attached, wings $g$, to push back any stones, clods, or other rubbish that may be upon the sides of the hills, to prevent the said rubbish from passing up the scoop E.

To the forward part of a side flange of the scoop E is hinged the lower end of a connecting-rod, F, the upper end of which is hinged to a foot-lever, G. The foot-lever G is fulcrumed to supports attached to the frame C in such a position that the driver from his seat can readily reach and operate the said foot-lever to adjust the forward end of the scoop E to work at any desired depth in the ground and to raise the said scoop E above the ground.

To the axle B is attached a gear-wheel, H, the teeth of which mesh into a small intermediate gear-wheel, I, journaled to the frame C. The teeth of the gear-wheel I mesh into the teeth of the gear-wheel J, attached to the shaft K, which revolves in bearings in the rear part of the frame C, and to it is attached a chain-wheel, L. Around the chain-wheel L passes an endless chain, M, which also passes around a chain-wheel, N, journaled to vertical slides $m$, working in ways in the forward parts of the frame C. The lower ends of the slides $m$ are attached to the forward parts of the sides of the scoop E, so that the chain-wheel N and its attachments will move up and down with the said scoop E.

To the endless chain M, at suitable distances apart, are attached plates or paddles O, which, as they are carried around by the movement of the said endless chain M, push the potatoes and soil up the inclined bottom of the scoop E, so that they will fall from the rear end of the said scoop to the upper end of the screen P, the soil passing through the meshes of the screen and the potatoes rolling down the screen and falling from its lower end to the ground. The screen P is supported by and rests upon a frame, Q, the forward end of which is hinged to the upper end of the scoop E. The lower end of the frame Q is supported by a small wheel, R, journaled to lugs attached to the said frame. The rear end of the screen is jostled or shaken by the passage of wheel R over the uneven surface of the soil, which movement materially assists in separating the potatoes from the soil, vines, weeds, and other trash, and also aids the discharge of potatoes from the screen. The said rear end of the latter, P, is connected at its center with the center of the lower end of the frame Q by a pivot, S. The sides of the screen P are bent upward, or have upwardly-projecting flanges formed upon or attached to them, to prevent the potatoes from passing off the screen at its sides.

To an upper corner of the screen P is hinged the end of a connecting-rod, T, the other end of which is pivoted to a crank-pin, U, attached to the small gear-wheel V, the journal of which works in bearings in hangers W, attached to the frame C. The teeth of the gear-wheel V mesh into the teeth of a larger gear-wheel, X, journaled to the frame C.

To the gear-wheel X, or to its journal, is rigidly attached a small beveled-gear wheel, Y, the teeth of which mesh into the teeth of a larger beveled-gear wheel, Z, attached to the axle B, so that the screen P will be vibrated to separate the potatoes and soil by the advance of the machine.

To the rear end of the frame Q or screen P are hinged the ends of a bail, *a*, upon the center of which is formed an eye or loop to receive the end of a cord or chain, *b*. The cord or chain *b* passes through a guide-hole formed in or around a guide-pulley connected with the rear end of the arm *c*, the forward end of which is rigidly attached to the rear part of the frame C. The forward end of the cord or chain *b* is attached to the lever *d*, the lower end of which is pivoted to the frame C in such a position that the upper end of the said lever can be readily reached and operated by the driver from his seat to raise the rear ends of the screen P and frame Q from the ground.

*e* is the driver's seat, the standards *f* of which are attached to the frame C in such a position that the weight of the driver will balance the machine.

In using the machine, as it is drawn forward along a row the potatoes and the soil in which they are embedded will be raised from the ground and discharged upon the screen, where the potatoes and soil are separated, the soil falling through the meshes of the said screen and the potatoes rolling down the screen and falling from its rear end to the ground.

With this construction the rapid vibration of the screen P removes any soil that may adhere to the potatoes, so that the potatoes will be clean when they drop to the ground.

Having thus described my invention, I claim as new and desire to secure by Letters Patent—

1. The combination, with the scoop E, of the frame Q, which is pivoted thereto at its forward end and provided with the rear supporting-wheel, R, the screen P, pivoted to said frame at its rear end, and mechanism for vibrating it, as specified, all arranged to operate as shown and described.

2. The combination, with the slotted frame C, axle B, and scoop E, whose forward end is vertically adjustable, of the vertical slides *m*, the chain-wheels L N, one of which is journaled in said slides, so as to move therewith, and the other on a fixed shaft, K, the endless chain M O, and the meshing gears H I J, all arranged as shown and described, to operate as specified.

EDWARD OSSIAN COOK.

Witnesses:
AUGUSTUS STONE,
JEROME M. STONE.